US012634930B2

(12) United States Patent
Mao et al.

(10) Patent No.: US 12,634,930 B2
(45) Date of Patent: May 19, 2026

(54) UPLINK DATA TRANSMISSION METHOD, ELECTRONIC DEVICE, AND STORAGE MEDIUM

(71) Applicant: RUIJIE NETWORKS CO., LTD., Fuzhou (CN)

(72) Inventors: Kaibin Mao, Fuzhou (CN); Longshun Wang, Fuzhou (CN)

(73) Assignee: RUIJIE NETWORKS CO., LTD., Fuzhou (CN)

( * ) Notice: Subject to any disclaimer, the term of this patent is extended or adjusted under 35 U.S.C. 154(b) by 0 days.

(21) Appl. No.: 19/208,030

(22) Filed: May 14, 2025

(65) Prior Publication Data

US 2025/0274934 A1      Aug. 28, 2025

Related U.S. Application Data

(63) Continuation of application No. PCT/CN2024/117266, filed on Sep. 5, 2024.

(30) Foreign Application Priority Data

Nov. 14, 2023    (CN) .......................... 202311514370.2

(51) Int. Cl.
| | |
|---|---|
| *H04W 72/00* | (2023.01) |
| *H04J 3/06* | (2006.01) |
| *H04W 72/0446* | (2023.01) |
| *H04W 72/1268* | (2023.01) |

(52) U.S. Cl.
CPC ....... *H04W 72/1268* (2013.01); *H04J 3/0667* (2013.01); *H04W 72/0446* (2013.01)

(58) Field of Classification Search
CPC ........... H04W 72/1268; H04W 72/0446; H04J 3/0667; H04J 3/06
See application file for complete search history.

(56) References Cited

U.S. PATENT DOCUMENTS

| | | | |
|---|---|---|---|
| 2014/0226984 A1* | 8/2014 | Roberts .............. | H04Q 11/0001 398/66 |
| 2021/0014887 A1* | 1/2021 | Lou ................... | H04W 72/1268 |

FOREIGN PATENT DOCUMENTS

| | | |
|---|---|---|
| CN | 101546169 A | 9/2009 |
| CN | 104734772 A | 6/2015 |
| CN | 111010628 A | 4/2020 |
| CN | 114567872 A | 5/2022 |

(Continued)

OTHER PUBLICATIONS

International Search Report and Written Opinion issued on Dec. 9, 2024, in corresponding International Application No. PCT/CN2024/117266, 12 pages.

*Primary Examiner* — Marcus Smith
*Assistant Examiner* — Zhaohui Yang
(74) *Attorney, Agent, or Firm* — Maier & Maier, PLLC

(57) ABSTRACT
An uplink data transmission method, an electronic device, and a storage medium. The method is applied to a user equipment and includes: when grant information from a central office device is received, determining a timeout period of a first timer based on a start time point of a granted time period indicated in the grant information, where the grant information is used to indicate the user equipment to transmit uplink data within the granted time period; and entering a hardware interrupt after the first timer runs for the timeout period, and entering the granted time period after the hardware interrupt ends.

14 Claims, 5 Drawing Sheets

Optical network unit

Optical line terminal

Splitter

Optical network unit

Optical network unit

(56)     References Cited

FOREIGN PATENT DOCUMENTS

WO      WO-2019075745  A1  *    4/2019   ..............  G06F  9/46
WO            2022042127  A1       3/2022

* cited by examiner

Optical network unit

Optical line terminal

Splitter

Optical network unit

Optical network unit

Ethernet central office device

ODN

Ethernet user equipment

Ethernet user equipment

UPLINK DATA TRANSMISSION METHOD, ELECTRONIC DEVICE, AND STORAGE MEDIUM

CROSS-REFERENCE TO RELATED APPLICATIONS

This application is a continuation of International Patent Application No. PCT/CN2024/117266 filed on Sep. 5, 2024, which claims priority to Chinese Patent Application No. 202311514370.2, filed with the China National Intellectual Property Administration on Nov. 14, 2023 and entitled "UPLINK DATA TRANSMISSION METHOD AND APPARATUS", which are incorporated herein by reference in their entireties.

TECHNICAL FIELD

This application relates to the field of fiber optic communication technologies, and in particular, to an uplink data transmission method, an electronic device, and a storage medium.

BACKGROUND

As shown in FIG. 1, in a passive optical network (PON), an optical line terminal (OLT) is connected to a plurality of optical network units (ONU) through a splitter. Therefore, in the network, uplink signals are transmitted from a plurality of different ONUs to the OLT.

If the uplink signals sent by the ONUs overlap on a line, the OLT cannot parse the uplink signals. Therefore, the OLT needs to specify transmission slots for the ONUs (in other words, the OLT grants slots to the ONUs), and then the ONUs transmit uplink data in their own granted slots to implement optical splitting.

SUMMARY

Embodiments of this application provide an uplink data transmission method, to provide a method for setting transmission timing in a conventional Ethernet chip, and implement on-time data transmission in a conventional Ethernet scenario.

According to a first aspect, an embodiment of this application provides an uplink data transmission method. The method is applied to a user equipment, and includes:

when grant information from a central office device is received, determining a timeout period of a first timer based on a start time point of a granted time period indicated in the grant information, where the grant information is used to indicate the user equipment to transmit uplink data within the granted time period; and entering a hardware interrupt after the first timer runs for the timeout period, and entering the granted time period after the hardware interrupt ends.

In the related art, if a user equipment performs another operation or program at a start time point of a granted time period, uplink data transmission time is delayed. To avoid delayed start of data transmission due to another operation or program, this application proposes to pre-enter the hardware interrupt before the start time point of the granted time period, and the user equipment does not perform any other operation after entering the hardware interrupt. Further, at an end time point of the hardware interrupt, the user equipment enters the granted time period to start to transmit the uplink data. According to this solution, a process of transmitting the uplink data by the user equipment is not affected by other programs. This avoids delayed transmission and implements precise control on uplink data transmission time.

In some embodiments, the specified duration is determined based on a maximum duration allowed for the hardware interrupt, and the end time point of the hardware interrupt is the start time point of the granted time period.

The determining the timeout period of the first timer based on the start time point of the granted time period indicated in the grant information includes:

determining the timeout period of the first timer based on a duration of the hardware interrupt and a time difference between the start time point and a first time point, where the first time point is a precision time protocol PTP time determined when the grant information is received.

Because local time of the user equipment deviates from precision time protocol (Precision Time Protocol, PTP) time, an error occurs if the first timer is directly set by using the local time. Based on this, this application proposes to determine PTP time corresponding to current time when calculation and timer setting need to be performed, and set timer by using the PTP time, to eliminate an error caused by a deviation between the local time and the PTP time.

In some embodiments, the method further includes:

periodically obtaining a precision time protocol PTP time, and synchronizing local time by using the obtained PTP time.

The first time point is determined in the following manner:

calibrating, based on a periodicity of obtaining PTP times, a last obtained PTP time, and a local time for the last obtained PTP time, a time point at which the grant information is received, to obtain the first time point.

The solution of periodically synchronizing the local time causes a deviation between the local time and the PTP time within a duration of a periodicity. To resolve this problem, this application proposes a method for calibrating the local time in real time. Synchronization between the local time and the PTP time is performed periodically. Therefore, a deviation value between the local time and the PTP time may be determined at a time point at which synchronization is performed, and a deviation value at each time point within a periodicity is calculated based on a proportion. In this way, the local time is calibrated in real time.

In some embodiments, the first time point is determined by using the following formula:

$$curr\_ptp = (curr\_tik - last\_tik) \times offset/cycle + last\_ptp,$$
where $curr\_ptp$ indicates the first time point, $curr\_tik$ indicates current local time of the user equipment, $last\_tik$ indicates local time at which synchronization is last performed, $offset$ indicates a deviation value between PTP time obtained when synchronization is last performed and the local time at which synchronization is last performed, $cycle$ indicates a periodicity of performing synchronization, and $last\_ptp$ indicates the PTP time obtained when synchronization is last performed.

In some embodiments, that an end time point of the hardware interrupt is reached is determined in the following manner:

determining, based on the time difference between the start time point and the first time point and a count value of a counter corresponding to the first time point, a first target count value corresponding to the start time point; and when the first timer times out, starting to determine whether the counter reaches the first target count value, and when the counter reaches the first target count value, determining that the end time point of the hardware interrupt is reached.

A round of timing ends at the time point of entering the hardware interrupt. Therefore, if whether the end time point of the hardware interrupt (namely, the start time point of the granted time period) is reached is determined by using a timer, the timer needs to be reset at the time point of entering the hardware interrupt. Resetting the timer takes specific time, and the duration of the hardware interrupt is short and is usually at a microsecond level. To avoid a problem that the hardware interrupt has ended but the setting of the timer has not been completed, this application proposes to use a counter to determine whether the start time point of the granted time period is reached. A value of a counter corresponding to the start time point is determined based on the time difference between the start time point of the granted time period and the first time point. In this way, when the counter reaches the determined value, transmission of the uplink data can be started.

In some embodiments, after the determining the timeout period of the first timer, the method further includes:

determining, based on the first target count value and the granted time period, a second target count value corresponding to an end time point of the granted time period; and stopping transmitting the uplink data when the counter reaches the second target count value.

According to the foregoing solution, after transmission of the uplink data is started, whether a transmission end time point is reached starts to be determined based on the counter, to precisely control stopping of transmission of the uplink data. Stopping the transmission in a timely manner can reduce impact on other operations of the equipment.

In some embodiments, before the determining, based on the first target count value and the granted time period, the second target count value corresponding to the end time point of the granted time period, the method further includes:

determining that a duration of the granted time period is less than a specified threshold.

In some embodiments, after the entering the hardware interrupt, and before the end time point of the hardware interrupt is reached, the method further includes:

reading, from a main memory, to-be-transmitted uplink data and an instruction required for transmitting the uplink data, and storing the read uplink data and the instruction in a buffer.

According to the foregoing solution, corresponding data and instructions are loaded from the main memory to the buffer after the hardware interrupt is performed, to prevent a cold start from affecting precise control on a transmission time point.

In some embodiments, before the second target count value corresponding to the end time point of the granted time period is determined based on the first target count value and the granted time period, it is determined that a duration of the granted time period is less than a specified threshold.

According to the foregoing solution, when it is determined that the granted time period is short, whether a transmission end time point is reached is determined by using a counter, to avoid a problem that a timer is inaccurate when being used within short time.

In some embodiments, after the determining the timeout period of the first timer, the method further includes:

setting a second timer based on the granted time period when transmission of the uplink data is started, and stopping transmitting the uplink data after the second timer runs for a timeout period, where a duration of the granted time period is not less than a specified threshold.

According to the foregoing solution, when the granted time period is long, whether a transmission end time point is reached may be determined by using a timer.

In some embodiments, the first timer is a hardware timer of the user equipment.

In some embodiments, the second timer is a hardware timer of the user equipment.

In some embodiments, the counter is a hardware counter of the user equipment.

Use of the hardware timer and the hardware counter can improve accuracy of timing and counting.

In some embodiments, when the first timer is set, a sum of the timeout period of the first timer and the duration of the hardware interrupt is equal to a period starting from the start time point.

According to a second aspect, an embodiment of this application provides an uplink data transmission apparatus. The apparatus is applied to a user equipment, or the apparatus is the user equipment, and the apparatus includes:

a communication unit, configured to receive grant information from a central office device, where the grant information is used to indicate the user equipment to transmit uplink data within a granted time period; and a processing unit, configured to: when the grant information is received, determine a timeout period of a first timer based on a start time point of the granted time period indicated in the grant information, where the processing unit is further configured to enter a hardware interrupt after the first timer runs for the timeout period, and enter the granted time period at an end time point of the hardware interrupt.

In some embodiments, a duration of the hardware interrupt is less than a maximum duration allowed for the hardware interrupt, an end time point of the hardware interrupt is the start time point of the granted time period, and the processing unit is specifically configured to:

determine the timeout period of the first timer based on a duration of the hardware interrupt and a time difference between the start time point and a first time point, where the first time point is a precision time protocol PTP time determined when the grant information is received.

In some embodiments, the processing unit is further configured to periodically obtain a precision time protocol PTP time, and synchronize local time by using the obtained PTP time.

When determining the first time point, the processing unit is specifically configured to:

calibrate, based on a periodicity of obtaining PTP time, last obtained PTP time, and a local time for the last obtained PTP time, a time point at which the grant information is received, to obtain the first time point.

In some embodiments, when determining that the end time point of the hardware interrupt is reached, the processing unit is specifically configured to:

determine, based on the time difference between the start time point and the first time point and a count value of a counter corresponding to the first time point, a first target count value corresponding to the start time point; and

when the first timer times out, start to determine whether the counter reaches the first target count value, and when the counter reaches the first target count value, determine that the end time point of the hardware interrupt is reached.

In some embodiments, the processing unit is further configured to:

read, from a main memory, to-be-transmitted uplink data and an instruction required for transmitting the uplink data, and store the read uplink data and the instruction in a buffer.

In some embodiments, the processing unit is further configured to:

determine, based on the first target count value and the granted time period, a second target count value corresponding to an end time point of the granted time period; and stop transmitting the uplink data when the counter reaches the second target count value, where a duration of the granted time period is less than a specified threshold.

In some embodiments, the processing unit is further configured to:

set a second timer based on the granted time period when transmission of the uplink data is started, and stop transmitting the uplink data after the second timer runs for a timeout period, where a duration of the granted time period is not less than a specified threshold.

In some embodiments, the first timer is a hardware timer of the user equipment.

In some embodiments, the counter is a hardware counter of the user equipment.

According to a third aspect, an electronic device is provided. The electronic device includes a controller and a memory. The memory is configured to store computer-executable instructions. The controller executes the computer-executable instructions in the memory to use a hardware resource in the controller to perform operation steps of the method according to any one of the possible implementations of the first aspect.

According to a fourth aspect, a computer-readable storage medium is provided. The computer-readable storage medium stores instructions. When the instructions are run on a computer, the computer is enabled to perform the methods in the foregoing aspects.

According to a fifth aspect, an embodiment of this application provides a computer program product, where the computer program product stores a computer program, and when the program is executed by a processor, the steps of the uplink data transmission method in this application are implemented.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

DETAILED DESCRIPTION OF EMBODIMENTS

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

In the specification, claims, and accompanying drawings of the present invention, the terms "first", "second", and the like are intended to distinguish between similar objects but do not necessarily indicate a specific sequence or order. It should be understood that data used in this way is interchangeable where appropriate so that the embodiments of the present invention described herein can be implemented in orders other than the order illustrated or described herein.

In a conventional optical splitting solution, to enable ONUs to precisely transmit uplink data based on their own transmission slots, a manufacturer needs to design a dedicated chip based on a PON protocol for implementation. In a current PON network, to enable ONUs to precisely transmit data based on their own transmission slots, a manufacturer needs to specially design and manufacture a PON chip that meets a requirement of a PON technology, so that the PON technology can be implemented at a MAC layer by using the PON chip. This implementation has high costs.

A conventional Ethernet chip that implements optical splitting through software configuration is limited by a non-real-time operating system (for example, a Linux system). Response time depends on system load, and precise time control cannot be implemented. Actual transmission slots of two ONUs may overlap, or a transmission slot may be wasted.

To implement precise data transmission based on an Ethernet chip of a user equipment and a time period granted by a central office device, the embodiments of this application propose an uplink data transmission method. An ONU sets a timer based on time granted by an OLT to pre-enter a hardware interrupt, to control uplink data transmission and avoid impact of system load on uplink data transmission. The solutions in the embodiments of this application enable an ONU to precisely upload data in a conventional Ethernet chip scenario.

Figure 1:
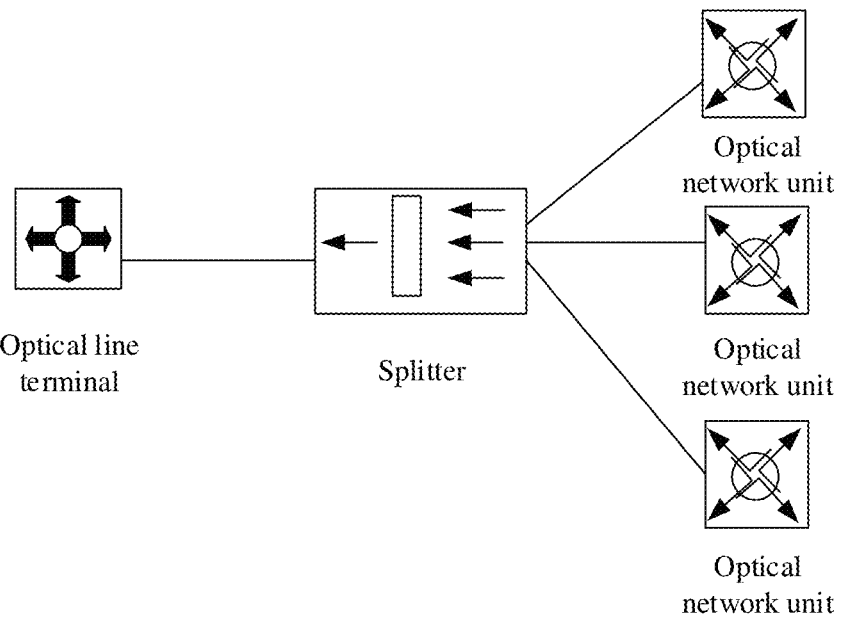
FIG. 1 is a schematic diagram of an architecture of an optical network in the related art.
Figure 2:
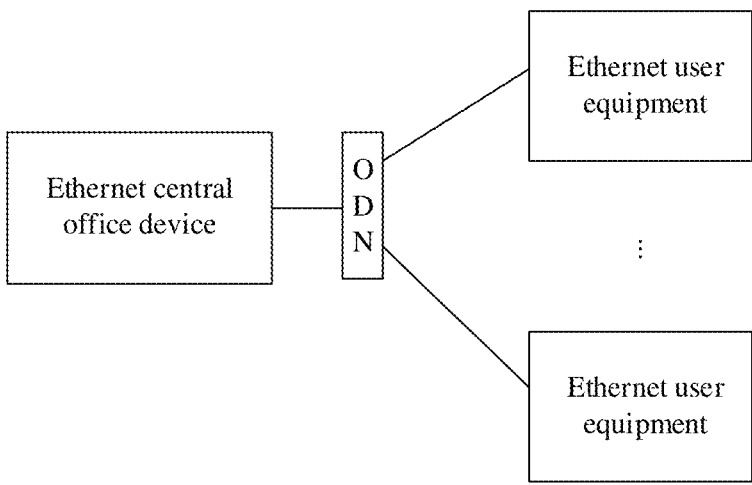
FIG. 2 is a schematic diagram of an architecture of a communication system according to an embodiment of this application.

For ease of understanding the solutions of this application, a communication system to which the embodiments of this application are applicable is described below. For example, FIG. 2 is a schematic diagram of an architecture of a communication system according to an embodiment of this application. As shown in FIG. 2, the communication system to which the embodiments of this application are applicable includes an Ethernet central office device, an Ethernet user equipment, and an ODN. The Ethernet central office device is connected to a plurality of Ethernet user equipments through the ODN. The ODN mainly includes three parts: a light source, an optical fiber, and an optical signal receiver. The light source may be a laser configured to generate an optical signal. The optical signal is transmitted to the Ethernet central office device or the plurality of Ethernet user equipments through the optical fiber. The optical signal receiver is configured to receive an optical signal from the Ethernet central office device or the Ethernet user equipment. The Ethernet central office device is configured to connect to a fiber-optic trunk cable, and is a device at an Ethernet ingress and an intranet ingress/egress. For example, the Ethernet central office device may also be referred to as an OLT device. The Ethernet central office device is configured to allocate an uplink data transmission slot to each Ethernet user equipment, and receive uplink data sent by each Ethernet user equipment in its own transmission slot.

It should be noted that the communication system shown in FIG. 2 is only an example, and a quantity of Ethernet user equipments included in the communication system is not limited in this application. For ease of description, subsequently, the Ethernet central office device included in FIG. 2 is referred to as a central office device, and the Ethernet user equipment is referred to as a user equipment.

Figure 3:
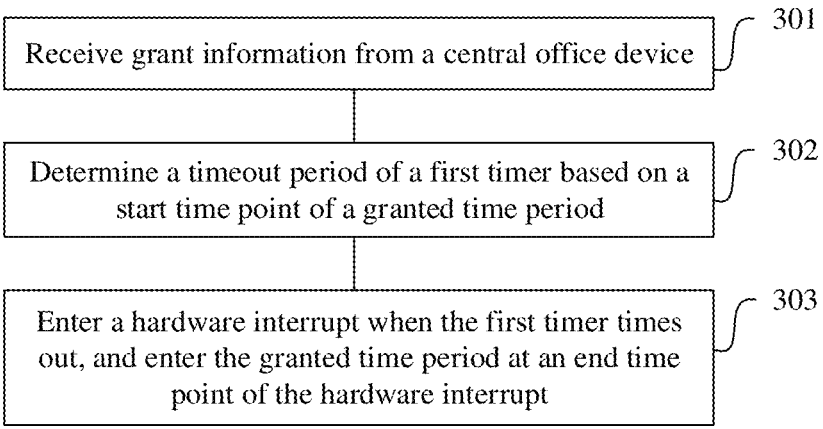
FIG. 3 is a schematic flowchart of an uplink data transmission method according to an embodiment of this application.

The solutions of this application are described below based on the architecture of the communication system shown in FIG. 2. For example, FIG. 3 is a schematic flowchart of an uplink data transmission method according to an embodiment of this application. Optionally, the method process shown in FIG. 3 may be performed by any one of the user equipments in FIG. 2, or may be performed by a specific component included in the user equipment, for example, may be performed by a processing chip, a CPU, a processing thread, or another component included in the user equipment. The method process shown in FIG. 3 specifically includes the following steps.

Step 301: Receive grant information from a central office device.

The grant information is used to indicate the user equipment to transmit uplink data within a granted time period. The granted time period is a time period in the future, and the granted time period may also be referred to as a granted transmission slot. The granted time period includes a start time point and an end time point. The start time point is used to indicate a time point at which the user equipment can start to transmit the uplink data. The end time point is used to indicate a time point at which the user equipment ends transmission of the uplink data.

For example, the central office device may periodically deliver grant information, for example, may deliver grant information before each data transmission periodicity starts, to indicate a transmission slot occupied by the user equipment within the data transmission periodicity. The transmission slot occupied by the user equipment is the granted time period.

302: Determine a timeout period of a first timer based on the start time point of the granted time period.

A time point at which the first timer runs for the timeout period is earlier than the start time point. The first timer is used to determine time of a hardware interrupt. To be specific, the user equipment pre-enters the hardware interrupt before the start time point, to ensure that no other program occupies resources at the start time point to affect start of data transmission. In an optional manner, the first timer may be a hardware timer of the user equipment, and therefore may control the hardware interrupt when the timeout period elapses.

303: Enter the hardware interrupt when the first timer times out, and enter the granted time period at an end time point of the hardware interrupt.

A duration of the hardware interrupt is less than a maximum duration allowed for the hardware interrupt, and the end time point of the hardware interrupt may be the start time point of the granted time period. For example, when the first timer is set, a sum of the timeout period of the first timer and the duration of the hardware interrupt is equal to a period starting from the start time point. Therefore, the user equipment enters the hardware interrupt after the first timer times out, the hardware interrupt lasts for specific time, and the end time point of the hardware interrupt is the start time point of the granted time period. In this way, when the hardware interrupt ends, it can be considered that the start time point is reached, and the uplink data can be transmitted.

In some cases, the user equipment is executing another code operation or another program at the start time point of the granted time period, which results in that the user equipment cannot transmit the uplink data on time, and transmission needs to be delayed. Based on this, this embodiment of this application proposes to enter the hardware interrupt within a period of time earlier than the start time point. During this period of time, the user equipment does not perform any other operation. Further, the end time point of the hardware interrupt is the start time point of the granted time period, and transmission of the uplink data is started when the hardware interrupt ends. According to this solution, a process of transmitting the uplink data by the user equipment is not affected by other programs. This avoids delayed transmission and implements precise control on uplink data transmission time.

Figure 4A:
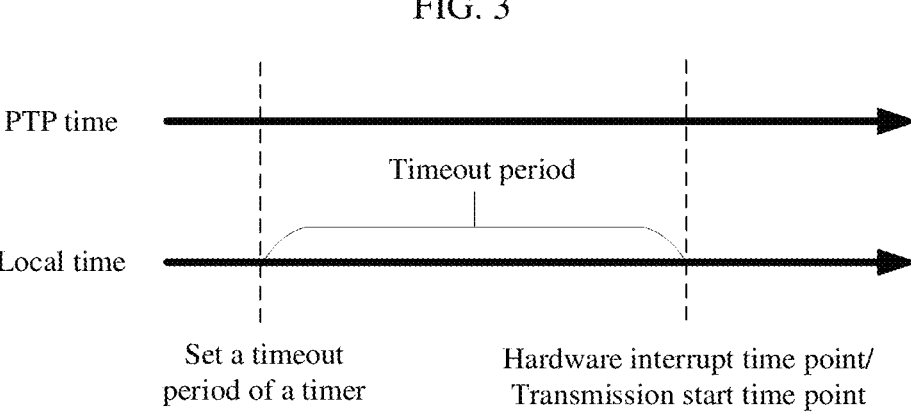
FIG. 4A is a schematic diagram of a timing relationship of uplink data transmission according to an embodiment of this application.
Figure 4B:
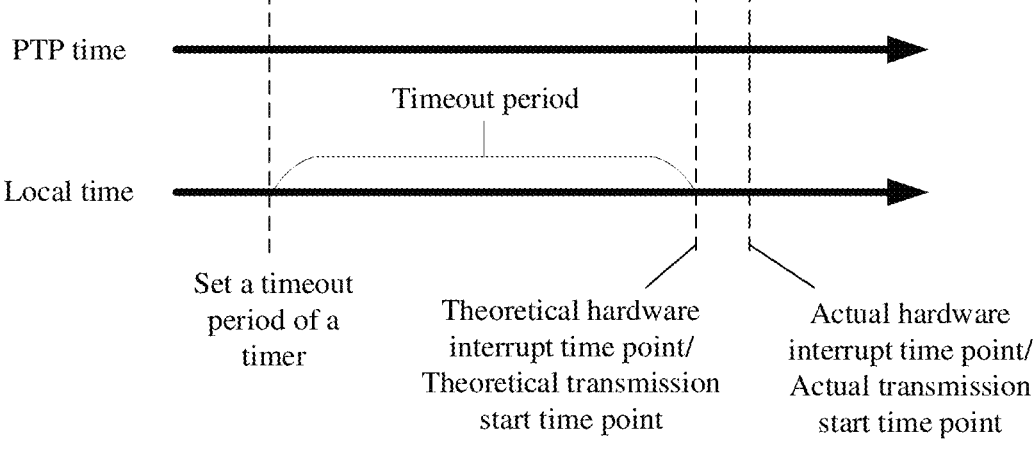
FIG. 4B is a schematic diagram of another timing relationship of uplink data transmission according to an embodiment of this application.

In some implementations, the hardware interrupt is performed when a transmission start time point is reached. For example, a timeout period of a timer may be set based on a time difference between a time point at which the grant information is received and the start time point of the granted time period. Then the hardware interrupt and uplink data transmission may be simultaneously performed after the timer runs for the timeout period. For example, as shown in FIG. 4A, the hardware interrupt and transmission start occur at a same time point. However, when a hardware interrupt time point (or a transmission start time point) is reached, transmission start time is delayed if a thread for performing data transmission is processing a hardware interrupt caused by another operation. For example, as shown in FIG. 4B, theoretical interrupt time and theoretical transmission start time are a timeout period of a set timer. However, actual transmission start time is delayed due to another hardware interrupt, and therefore uplink data transmission time cannot be precisely controlled. In view of this, this embodiment of this application proposes to advance hardware interrupt time, and an advance duration is determined based on the maximum duration allowed for the hardware interrupt, so that the uplink data can still be precisely transmitted even if another hardware interrupt causes interference.

For example, a time point of entering the hardware interrupt may be determined by setting a timer. For example, a hardware timer may be used, so that the user equipment enters the hardware interrupt after the hardware timer runs for a timeout period. For ease of description, the timer used to determine the time point of entering the hardware interrupt is referred to as the first timer.

Figure 5:
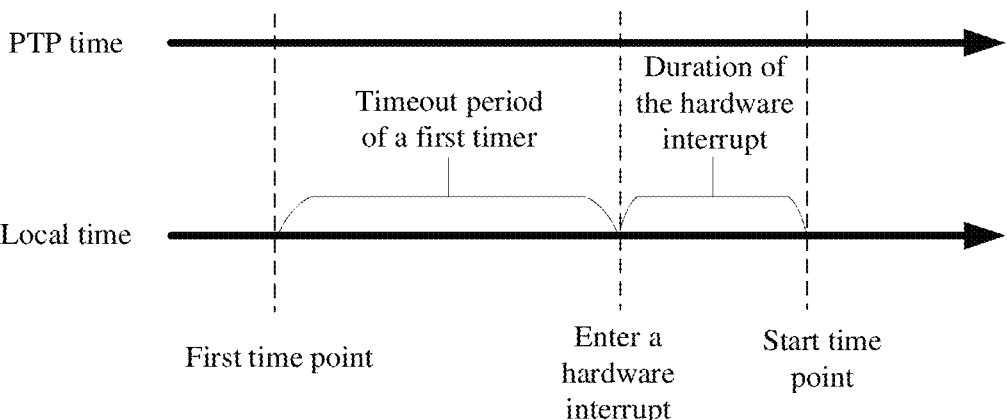
FIG. 5 is a schematic diagram of another timing relationship of uplink data transmission according to an embodiment of this application.

When the timeout period of the first timer is set, the timeout period may be determined based on a duration of the hardware interrupt and a time difference between the start time point and a first time point. The first time point is PTP time determined when the grant information is received. The user equipment performs calculation and sets the first timer at the first time point. For example, the user equipment may first calculate the time difference between the start time point and the first time point. For example, the calculated time difference is 10 minutes. Further, the user equipment may calculate a difference between the time difference and the duration of the hardware interrupt, and use the difference as the timeout period of the first timer. For example, if the time difference between the start time point and the first time point is 10 minutes and the duration of the hardware interrupt is 2 minutes, the timeout period of the first timer is 8 minutes. The user equipment enters the hardware interrupt after the first timer runs for the timeout period. The end time point of the hardware interrupt is the start time point, and therefore transmission of the uplink data is started at the start time point. In an example, FIG. 5 shows a timing relationship between the hardware interrupt and the start time point.

Further, because the duration of the hardware interrupt is short and is usually at microsecond level, an error occurs when whether the end time point of the hardware interrupt is reached (in other words, whether the start time point of the granted time period is reached) is re-determined by using a timer after the hardware interrupt is performed. Therefore, this embodiment of this application proposes to determine, based on the time difference between the start time point of the granted time period and the first time point, a value of a counter corresponding to the start time point. In this way, when the counter reaches the determined value, it can be determined that the end time point of the hardware interrupt is reached, and transmission of the uplink data can be started. For example, when the value of the counter is a first target count value, it can be determined, based on the time difference, that the end time point of the hardware interrupt is reached, and transmission of the uplink data is started. For example, the counter is defined to increase by 1 per second, the time difference between the first time point and the start time point is 100s, and a count value of a counter corresponding to the first time point is 1200. In this case, it can be determined that the first target count value corresponding to the start time point is 1300. Further, after the user equipment enters the hardware interrupt, whether the count value of the counter reaches 1300 may be cyclically determined, and transmission of the uplink data is started when the counter reaches 1300. For example, the counter described in the foregoing embodiment may be a hardware counter of the user equipment, for example, a count counter of a CPU coprocessor of an MT7621 platform. Precision of the counter is half of a CPU clock frequency. For example, the clock frequency is 880 MHz. In this case, the precision of the count counter is 1/440 μs, and the precision is 2.3 ns. During the hardware interrupt, the CPU is in an idle state, and cyclically reads a value of the counter and determines whether the value of the counter reaches the first target count value corresponding to the start time point. In addition, when the first target count value is reached, the hardware interrupt ends, and transmission of the uplink data is started.

Figure 6:
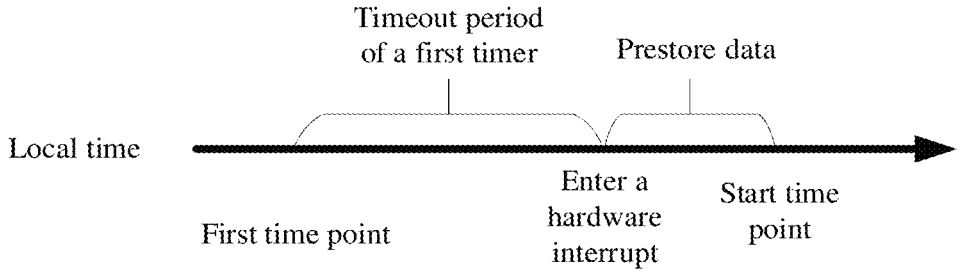
FIG. 6 is a schematic diagram of another timing relationship of uplink data transmission according to an embodiment of this application.

Before the uplink data is transmitted, a medium access control (MAC) layer and an output optical port further need to be activated. An activation operation includes an operation on a register and an operation on an input/output (I/O) interface. In some cases, for example, when code is executed for the first time or redirection is performed to a new code block, a cold start may occur, to be specific, no instruction required for data transmission is stored in a buffer. Therefore, the operations performed on the register and the I/O interface cannot take effect immediately, and corresponding data and instructions need to be read from a main memory. This takes longer time than directly reading data from the buffer. Based on this, this embodiment of this application proposes to read data and instructions from the main memory upon entry into the hardware interrupt, and store the read data and instructions in the buffer. Therefore, when the hardware interrupt ends, the data and instructions have been cached, and data transmission can be directly performed. This reduces a delay caused by caching missed data or instructions during data transmission. For example, FIG. 6 shows a timing relationship between the hardware interrupt, pre-storage of data and instructions, and transmission start.

In some embodiments, after the start time point is determined, a transmission end time point may be further determined based on a duration of the granted time period. In a possible scenario, the granted time period is long. In this case, a timer may be reset and started after transmission of the uplink data is started, to determine the transmission end time point. For example, a second timer may be set after transmission of the uplink data is started. A timeout period of the second timer ends at the end time point of the granted time period. Further, after the second timer runs for the timeout period, transmission of the uplink data is stopped.

In another possible scenario, the granted time period is short, and an error occurs if whether the transmission end time point is reached is determined by using a timer. Therefore, this application proposes to determine the transmission end time point by using a counter. For example, the first target count value corresponding to the start time point of the granted time period may be obtained, an increment count value between the start time point and the transmission end time point is determined based on the duration of the granted time period, and a sum of the determined count value and the first target count value is used as a second target count value. The second target count value is a count value of a counter corresponding to the transmission end time point. For example, still in the example in the foregoing embodiment, the first target count value is 1300, and the duration of the granted time period is 10 s. In this case, an increment count value of a corresponding counter within the granted time period is 10. Further, the second target count value may be determined based on the increment count value within the granted time period and the first target count value. To be specific, the second target count value is as follows: 1300+10=1310. Further, when the counter reaches 1310, transmission of the uplink data may be stopped.

Figure 7:
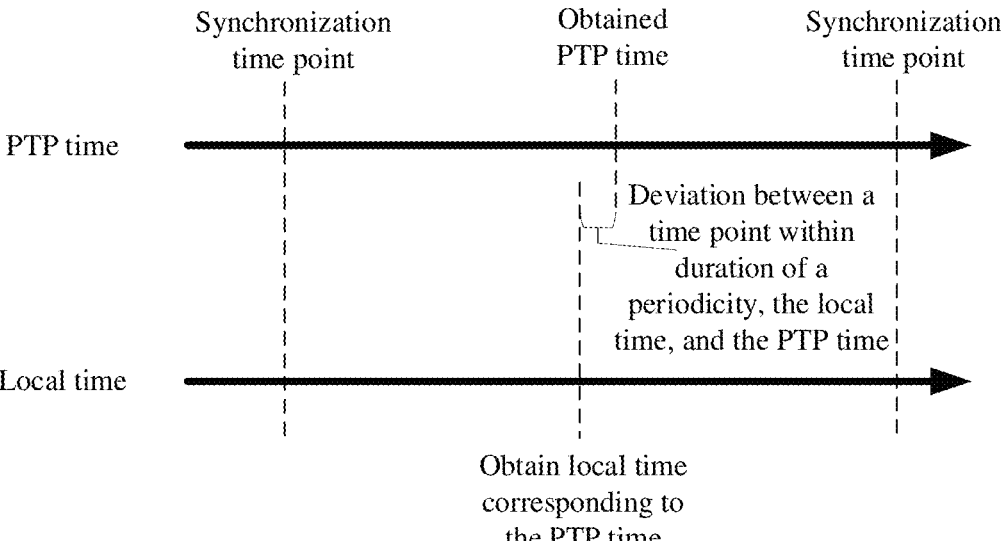
FIG. 7 is a schematic diagram of comparison between PTP time and local time according to an embodiment of this application.

To improve precision of a data transmission time point, this application proposes to determine PTP time corresponding to current time when the grant information is received, and update local time (to be specific, the first time point described in the foregoing embodiment) by using the determined PTP time. The PTP protocol is a protocol for synchronizing a clock throughout a computer network. In a local area network, the PTP protocol can achieve submicrosecond-level clock precision, to adapt to a measurement and control system. Therefore, the user equipment periodically synchronizes PTP time and local time, to be specific, periodically obtains PTP time and synchronizes local time by using the obtained PTP time. In this manner, there is a specific deviation between local time and PTP time within a duration of a periodicity. For example, FIG. 7 is a schematic diagram of comparison between PTP time and local time. To resolve the problem of periodic synchronization, this application proposes to calculate a deviation value between local time and PTP time at a time point at which synchronization is performed, and calculate a deviation value at each time point within a duration of a periodicity based on a proportion, to calibrate the local time in real time. For example, when receiving the grant information, the user equipment may calibrate current local time by using a periodicity of performing synchronization, PTP time obtained when synchronization is last performed, and local time at which synchronization is last performed, to obtain the first time point. In an example, the first time point may be calculated by using the following formula (1):

$$\text{curr\_ptp}=(\text{curr\_tik}-\text{last\_tik})\times\text{offset/cycle}+\text{last\_ptp} \quad \text{Formula} \quad (1)$$

curr_ptp indicates the first time point, curr_tik indicates the current local time, last_tik indicates the local time at which synchronization is last performed, offset indicates a deviation value between the PTP time obtained when synchronization is last performed and the local time at which synchronization is last performed, cycle indicates the periodicity of performing synchronization, and last_ptp indicates the PTP time obtained when synchronization is last performed.

Figure 8:
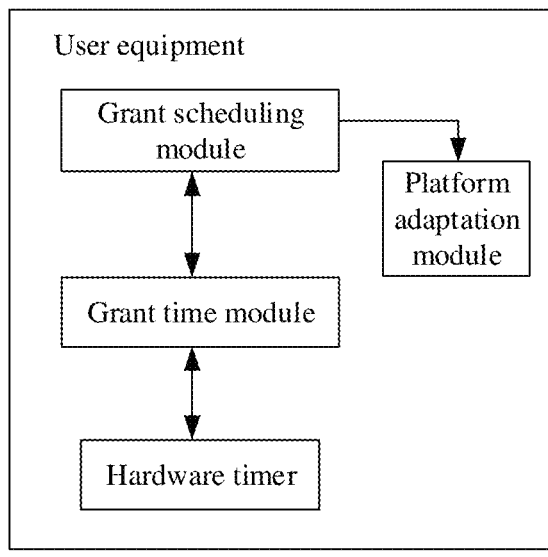
FIG. 8 is a schematic diagram of a structure of a user equipment according to an embodiment of this application.

In an example, the steps performed by the user equipment in the foregoing embodiments may be performed by specific modules in the user equipment. For example, for a schematic diagram of a structure of the user equipment, refer to FIG. 8. The user equipment includes a grant scheduling module, a grant time module, a platform adaptation module, and a hardware timer. For example, the grant scheduling module may be configured to: receive grant information from a central office device; indicate, based on a granted time period included in the grant information and current PTP time, the grant time module to set the corresponding hardware timer; and after the timer runs for a timeout period, invoke an interface in the platform adaptation module to transmit uplink data. The grant time module is configured to calculate PTP time based on local time, for example, may calculate a first time point by using the foregoing formula (1), and provide the first time point for the grant scheduling module. The grant time module is further configured to set the hardware timer as indicated by the grant scheduling module. The platform adaptation module is configured to provide a unified operation interface, for example, provide an interface for performing uplink data transmission. It should be noted that FIG. 8 is only an example, and the modules shown in the figure are described only functionally and do not constitute a limitation on the structure of the user equipment.

Figure 9:
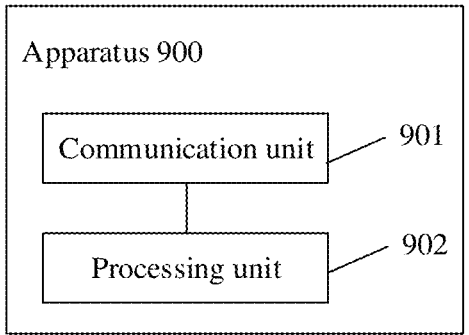
FIG. 9 is a schematic diagram of a structure of an uplink data transmission apparatus according to an embodiment of this application.

Based on a concept same as that of the foregoing method, FIG. 9 shows an uplink data transmission apparatus 900 according to an embodiment of this application. The apparatus 900 is configured to perform the steps disclosed in the foregoing method embodiments. To avoid repetition, details are not described herein again. The apparatus 900 includes a communication unit 901 and a processing unit 902.

The communication unit 901 is configured to receive grant information from a central office device, where the grant information is used to indicate a user equipment to transmit uplink data within a granted time period.

The processing unit 902 is configured to: when the grant information is received, determine a timeout period of a first timer based on a start time point of the granted time period indicated in the grant information.

The processing unit 902 is further configured to enter a hardware interrupt after the first timer runs for the timeout period, and enter the granted time period at an end time point of the hardware interrupt.

In some embodiments, a duration of the hardware interrupt is less than a maximum duration allowed for the hardware interrupt, an end time point of the hardware interrupt is the start time point of the granted time period, and the processing unit 902 is specifically configured to:

determine the timeout period of the first timer based on a duration of the hardware interrupt and a time difference between the start time point and a first time point, where the first time point is a precision time protocol PTP time determined when the grant information is received.

In some embodiments, the processing unit 902 is further configured to periodically obtain a precision time protocol PTP time, and synchronize local time by using the obtained PTP time.

When determining the first time point, the processing unit 902 is specifically configured to:

calibrate, based on a periodicity of obtaining PTP times, a last obtained PTP time, and a local time for the last obtained PTP time, a time point at which the grant information is received, to obtain the first time point.

In some embodiments, when determining that the end time point of the hardware interrupt is reached, the processing unit 902 is specifically configured to:

determine, based on the time difference between the start time point and the first time point and a count value of a counter corresponding to the first time point, a first target count value corresponding to the start time point; and when the first timer times out, start to determine whether the counter reaches the first target count value, and when the counter reaches the first target count value, determine that the end time point of the hardware interrupt is reached.

In some embodiments, the processing unit 902 is further configured to:

read, from a main memory, to-be-transmitted uplink data and an instruction required for transmitting the uplink data, and store the read uplink data and the instruction in a buffer.

In some embodiments, the processing unit 902 is further configured to:

determine, based on the first target count value and the granted time period, a second target count value corresponding to an end time point of the granted time period; and stop transmitting the uplink data when the counter reaches the second target count value, where a duration of the granted time period is less than a specified threshold.

In some embodiments, the processing unit 902 is further configured to:

set a second timer based on the granted time period when transmission of the uplink data is started, and stop transmitting the uplink data after the second timer runs for a timeout period, where a duration of the granted time period is not less than a specified threshold.

In some embodiments, the first timer is a hardware timer of the user equipment.

In some embodiments, the counter is a hardware counter of the user equipment.

Figure 10:
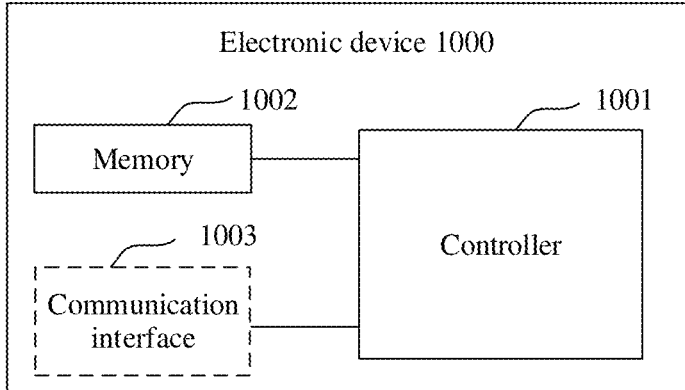
FIG. 10 is a schematic diagram of a structure of an electronic device according to an embodiment of this application.

FIG. 10 is a schematic diagram of a structure of an electronic device 1000 according to an embodiment of this application. The electronic device 1000 in this embodiment of this application may further include a communication interface 1003. The communication interface 1003 is, for example, a network interface. The electronic device may transmit data through the communication interface 1003. For example, the communication interface 1003 may implement the functions of the communication unit 901 in FIG. 9.

In this embodiment of this application, a memory 1002 stores instructions that can be executed by at least one controller 1001, and the at least one controller 1001 may be configured to perform the steps of the foregoing method by executing the instructions stored in the memory 1002. For example, the controller 1001 may implement the functions of the processing unit 902 in FIG. 9.

The controller 1001 is a control center of the electronic device, and may be connected to all components of the electronic device through various interfaces and lines, and run or execute instructions stored in the memory 1002 and invoke data stored in the memory 1002. Optionally, the controller 1001 may include one or more processing units. An application controller and a modem controller may be integrated in the controller 1001. The application controller mainly processes an operating system, an application program, and the like. The modem controller mainly processes wireless communication. It can be understood that the modem controller may alternatively not be integrated in the controller 1001. In some embodiments, the controller 1001 and the memory 1002 may be implemented in a same chip. In some embodiments, the controller 1001 and the memory 1002 may alternatively be implemented separately in separate chips.

The controller 1001 may be a general-purpose controller, for example, a central controller (Central Processing Unit, CPU for short), a digital signal controller, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose controller may be a microcontroller, any conventional controller, or the like. The steps of the uplink data transmission method disclosed with reference to the embodiments of this application may be directly performed and completed by a hardware controller, or may be performed and completed by a combination of a hardware module and a software module in the controller.

As a non-volatile computer-readable storage medium, the memory 1002 may be configured to store non-volatile software programs, non-volatile computer-executable programs, and modules. The memory 1002 may include at least one type of storage medium, for example, may include a flash memory, a hard disk, a multimedia card, a memory card, a random access memory (English: Random Access Memory, RAM for short), a static random access memory (English: Static Random Access Memory, SRAM for short), a programmable read-only memory (English: Programmable Read Only Memory, PROM for short), a read-only memory (English: Read Only Memory, ROM for short), an electrically erasable programmable read-only memory (English: Electrically Erasable Programmable Read-Only Memory, EEPROM for short), a magnetic memory, a magnetic disk, a compact disc, or the like. The memory 1002 is, but not limited to, any other medium that can be used to carry or store desired program code in a form of an instruction or a data structure and can be accessed by a computer. The memory 1002 in the embodiments of this application may alternatively be a circuit or any other apparatus that can implement a storage function, and is configured to store program instructions and/or data.

Through programming of the controller 1001, for example, code corresponding to the method described in the foregoing embodiments may be built into a chip, so that the chip can perform the steps of the foregoing method during running. How to perform programming on the controller 1001 is a technology known to a person skilled in the art, and details are not described herein.

A person skilled in the art should understand that the embodiments of this application may be provided as a method, a system, or a computer program product. Therefore, this application may be implemented in a form of a hardware-only embodiment, a software-only embodiment, or an embodiment with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a controller of another programmable data processing device to generate a machine, so that the instructions executed by the computer or the controller of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although preferred embodiments of this application have been described, persons skilled in the art can make additional changes and modifications to these embodiments once they learn the basic inventive concept. Therefore, the appended claims shall be construed to cover the preferred embodiments and all changes and modifications falling within the scope of the embodiments of this application.

Clearly, a person skilled in the art can make various changes and variations to this application without departing from the spirit and scope of this application. Therefore, this application is also intended to cover the changes and variations provided that the changes and variations of this application fall within the scope of the claims of this application or equivalent technologies thereof.

What is claimed is:

1. An uplink data transmission method, wherein the method is applied to a user equipment, and the method comprises:
   when grant information from a central office device is received, determining a timeout period of a first timer based on a start time point of a granted time period indicated in the grant information, wherein the grant information is used to indicate the user equipment to transmit uplink data within the granted time period; and
   entering a hardware interrupt after the first timer runs for the timeout period, and entering the granted time period after the hardware interrupt ends;
   wherein determining the timeout period of the first timer based on the start time point of the granted time period indicated in the grant information comprises determining the timeout period of the first timer based on a duration of the hardware interrupt and a time difference between the start time point and a first time point;
   wherein the first time point is determined by using the following formula:

$$curr\_ptp = (curr\_tik - last\_tik) \times offset/cycle + last\_ptp,$$

wherein curr_ptp indicates the first time point, curr_tik indicates current local time of the user equipment, last_tik indicates a local time at which synchronization is last performed, offset indicates a deviation value between a PTP time obtained when synchronization is last performed and the local time at which synchronization is last performed, cycle indicates a periodicity of performing synchronization, and last_ptp indicates the PTP time obtained when synchronization is last performed.

2. The method according to claim 1, wherein a duration of the hardware interrupt is less than a maximum duration allowed for the hardware interrupt, and an end time point of the hardware interrupt is the start time point of the granted time period.

3. The method according to claim 1, wherein the first time point is a precision time protocol PTP time determined when the grant information is received.

4. The method according to claim 3, wherein an end time point of the hardware interrupt being reached is determined by:
   determining, based on the time difference between the start time point and the first time point, and a count value of a counter corresponding to the first time point, a first target count value corresponding to the start time point; and when the first timer times out, starting to determine whether the counter reaches the first target count value, and when the counter reaches the first target count value, determining that the end time point of the hardware interrupt is reached.

5. The method according to claim 4, wherein after determining the timeout period of the first timer, the method further comprises:
   determining, based on the first target count value and the granted time period, a second target count value corresponding to an end time point of the granted time period; and
   stopping transmitting the uplink data when the counter reaches the second target count value.

6. The method according to claim 5, wherein before determining, based on the first target count value and the granted time period, the second target count value corresponding to the end time point of the granted time period, the method further comprises:
   determining that a duration of the granted time period is less than a specified threshold.

7. The method according to claim 1, further comprising:
   periodically obtaining a precision time protocol PTP time, and synchronizing a local time by using the obtained PTP time.

8. The method according to claim 7, wherein the first time point is determined by:
   calibrating, based on a periodicity of obtaining PTP times, a last obtained PTP time, and a local time for the last obtained PTP time, a time point at which the grant information is received, to obtain the first time point.

9. The method according to claim 1, wherein after entering the hardware interrupt, and before the hardware interrupt ends, the method further comprises:
   reading, from a main memory, the to-be-transmitted uplink data and an instruction required for transmitting the uplink data, and storing the read uplink data and the instruction in a buffer.

10. The method according to claim 1, wherein after determining the timeout period of the first timer, the method further comprises:
   setting a second timer based on the granted time period when transmission of the uplink data is started, and stopping transmitting the uplink data after the second timer runs for a timeout period.

11. The method according to claim 10, wherein the second timer is a hardware timer of the user equipment.

12. The method according to claim 1, wherein the first timer is a hardware timer of the user equipment.

13. An electronic device, wherein the electronic device comprises a controller and a memory, wherein
   the memory is configured to store a computer program or instructions; and
   the controller is configured to execute the computer program or the instructions in the memory, so that the method according to claim 1 is performed.

14. A non-transitory computer-readable storage medium, wherein the non-transitory computer-readable storage medium stores computer-executable instructions, and when the computer-executable instructions are invoked by a computer, the computer is enabled to perform the method according to claim 1.

* * * * *